United States Patent [19]

Jenkins

[11] Patent Number: 5,065,581

[45] Date of Patent: Nov. 19, 1991

[54] POWER PLANT AND METHOD OF PRODUCTION OF SYNCHRONOUS COMMERCIAL ELECTRIC POWER USING DIESEL ELECTRIC LOCOMOTIVES

[75] Inventor: Christopher P. Jenkins, Reisterstown, Md.

[73] Assignee: Energy Resources & Logistics, Inc., Baltimore, Md.

[21] Appl. No.: 602,570

[22] Filed: Oct. 24, 1990

[51] Int. Cl.⁵ .............................................. H02P 9/04
[52] U.S. Cl. ........................................ 60/668; 60/652; 60/721; 290/1 R; 290/3
[58] Field of Search ......................... 60/668, 652, 721; 290/1 R, 3

[56] References Cited

U.S. PATENT DOCUMENTS 2,183,364  12/1939  Bailey .
2,215,646   9/1940  Kuhns .
4,092,554   5/1978  Quinn .
4,342,921   8/1982  Williams .
4,548,164  10/1985  Ylonen et al. .

Primary Examiner—Allen M. Ostranger
Attorney, Agent, or Firm—Rothwell, Figg, Ernst & Kurz

[57] ABSTRACT

A power plant and method of production of synchronous electric power utilizes diesel railroad locomotives which, when connected in parallel and when suitably governed and connected, can provide utility grade electrical power during periods of peak electrical demand while still supplementing the railroad fleet during the remainder of the year. The dual use of railroad locomotives provides substantial economic benefits to both rail carriers and electrical utilities with complimentary seasonal peaks.

8 Claims, 1 Drawing Sheet

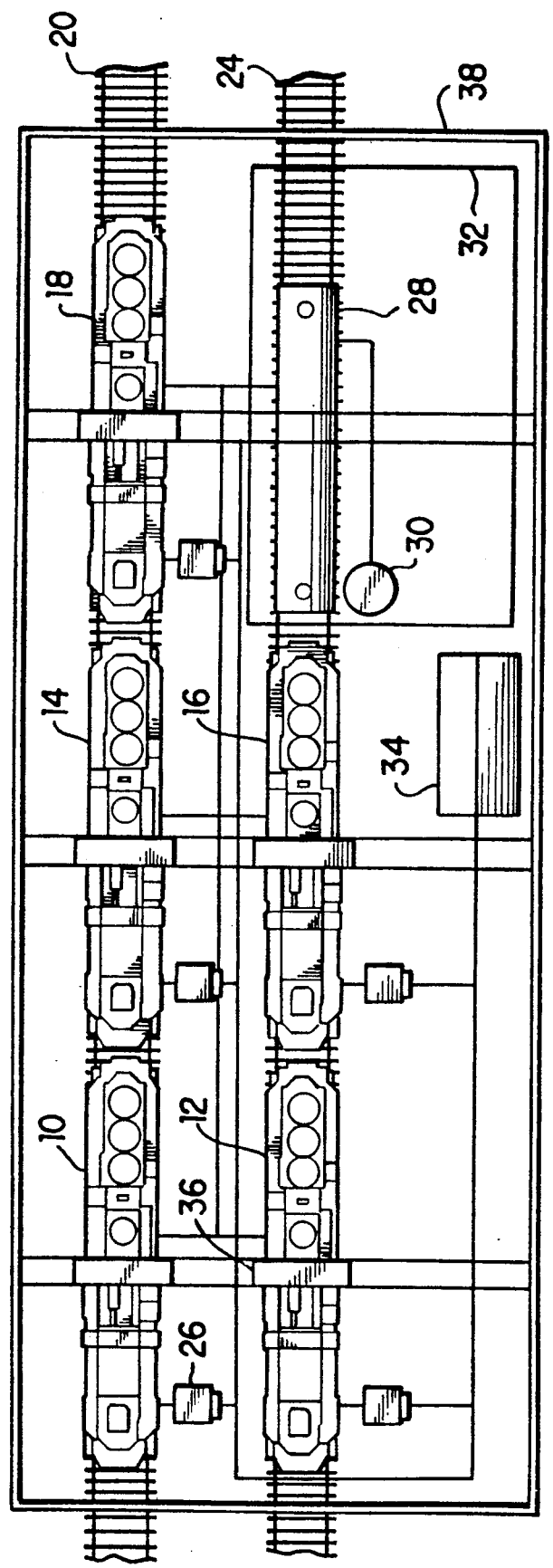

1

POWER PLANT AND METHOD OF PRODUCTION OF SYNCHRONOUS COMMERCIAL ELECTRIC POWER USING DIESEL ELECTRIC LOCOMOTIVES

BACKGROUND OF THE INVENTION

1. Field of the Invention

This invention relates to both the method of production of electric power and an electric power plant using diesel engine locomotives and particularly to a process and plant for the seasonal peak production of synchronous commercial electric power using railroad diesel electric locomotives.

2. Background Art

Railroads utilize conventional diesel electric locomotives as the power for their railroad fleet. Railroad traffic volumes usually reach their peak during the fall and spring periods while electric power requirements of most utility periods peak during the summer or winter months.

Electric utilities which require peak demand prefer not to add further utility power generating plants to meet such demand as such requires substantial design, engineering and particularly capital expenses and in non-peak periods, the facility would not be used. Similarly, railroads must have sufficient locomotives to move traffic during peak periods but during non-peak periods, at least some of the locomotives will be idle.

There is a need to provide synchronous electric power at utility transmission or subtransmission voltages for a commercial electric utility grid to meet peak power demands without the incurrence of substantial capital and other costs. Similarly, there is a need in the art to utilize railroad locomotives during non-peak periods to their maximum.

SUMMARY OF THE INVENTION

Conventional diesel electric locomotives include diesel engines with speed governors driving generators which produce power to electric motors driving railroad axles containing the railroad wheels to move the locomotives and a load (e.g., railroad cars) connected to the locomotives over the railroad tracks.

Such conventional diesel electric railroad locomotives with certain modifications are utilized to provide utility grade electric power, particularly during periods of peak electric demand and to supplement the railroad fleet during the remainder of the year. The dual use of such locomotives provides substantial economic benefits to both the rail carriers and the electric utilities which have complimentary seasonal peaks.

More particularly, two or more conventional diesel electric railroad locomotives are connected in parallel to generate synchronous electrical power at utility transmission or subtransmission voltages. The locomotives are placed under the generation dispatch control of the electric utility and hence can function as part of a utility interconnected grid. The installation is equipped with external step-up transformers to convert the low voltage alternating current output of the locomotive generator to a useful voltage. Appropriate relays, breakers and other switch gear are provided to allow the generating equipment to be conducted to the grid.

The locomotives are equipped with simplified electrical connections allowing them to be easily connected to the step-up transformers. Optionally, the locomotives are provided with external steam generators coupled to their exhaust allowing the facility to operate as a cogeneration facility. An exhaust gas silencer either as part of a steam generator or as a discrete item may be provided. An induced draft fan is also provided, if required, to limit exhaust back pressure.

The locomotives may be surrounded with a roofless enclosure for security, noise attenuation, and such enclosure acts as a visual shield. One or more conventional railroad tank cars are provided and fluid connections are made with each of the locomotive fuel tanks. Automatic fuel cut-off leak detection spill container may also be provided.

BRIEF DESCRIPTION OF THE DRAWINGS

The single Figure is a schematic illustration of a preferred embodiment of a power plant utilizing a plurality of conventional diesel electric locomotives of this invention.

DETAILED DESCRIPTION OF THE PREFERRED EMBODIMENTS

As shown in FIG. 1, a plurality of conventional 4,000 HP diesel railroad locomotives 10, 12, 14, 16, 18 are positioned on parallel railroad tracks 20 and 22. The locomotives are the standard diesel electric locomotives as used in railroads and have a diesel engine which drives an electric generator which in turn, in railroad use, drives motors connected to axles bearing the railroad wheels. When used as a power plant, the generators are disconnected from the motors and the outputs of the generators may be fed to suitable step-up transformers such as transformer 26. There is a similar transformer positioned adjacent each locomotive and the transformers may be 13.5 kv 3768 kva step-up transformers. The connection between the diesel engine generator and the transformer may be a suitable quick connection.

The railroad tracks 20 and 24 are preferably in a railroad yard.

Supplying fuel to each of the diesel engine locomotives, a standard 20,000 gallon railroad tank car 28 may be positioned on track 22 and connected to a suitable primary fuel pump 30. The fuel pump would pump fuel to each of the locomotives. The system may have a spill containment vessel 32 and may also be provided with automatic fuel shut-off, leak detection, and similar fuel safety and environmental controls as are known in the art.

The electricity generated by the diesel locomotive generators and fed to the step-up transformers 26 is then fed to suitable switch gear and controls within a switch gear and control shack 34 from which it can be fed into an electrical utility grid.

Each of the diesel locomotives may be provided with an external silencer 36 for its exhaust stack. The silencer could be a discrete device or it could be part of an external steam generator coupled to the diesel engine exhaust so that the facility could provide co-generation. Also, induced draft fans may be provided to limit the exhaust back pressure of the diesel engines.

The locomotives may be surrounded by a roofless enclosure 38 which provides security, noise attenuation, and can provide a visual shield. Obviously, suitable doors could be provided in the roofless enclosure for movement of the locomotive and tank cars along the tracks.

There are significant benefits to the invention. The most costly item of the generating plant, namely, the diesel locomotives, are removed from the generating facility during non-peak periods and employed in railroad service. In a conventional electric generating plant which must be designed for meeting peak loads, the peak load equipment could remain idle until a future peak period was encountered, often many months away. The economic value of the locomotives to the railroad materially reduces the cost of the power plant using the locomotives, as the owner of the locomotives could collect a rental or usage fee. From the perspective of the railroad, many of the same benefits that the utility reaps would apply, as the railroad is provided with additional locomotives for the bulk of the year, but the additional ownership costs are reduced by the value of the locomotives to the utility in generating power.

Most utility generating plants require substantial design and engineering expense whereas the diesel railroad locomotives are a standard production line item and the plant design and engineering costs are greatly diminished.

Because the power plant is on rails, it is largely mobile. In addition to having dual seasonal use of the alternate peak periods for railroads and utilities as outlined above, the generating plant can be easily moved in its entirety if such is required by the electric utility.

Because no fixed structures other than the enclosure 38 are required, property taxes should be minimized. Moreover, building permit requirements and other requirements normally associated with a large fixed facility power plant would be largely eliminated.

The physical appearance of the facility without the enclosure in place is similar to that of a conventional railroad equipment, hence, if the power plant is placed in an area where railroad equipment is already present, such as a railroad yard, it should have virtually no visual effect.

Because fuel is supplied from a standard railroad tank car, no fixed fuel storage tanks are required.

Because the entire power plant is basically mounted on railroad cars, no excavation or foundations are required.

As can be seen, this invention provides a unique use of diesel railroad locomotives to produce synchronous power on an interconnected basis with the utility grid as opposed to non-synchronous power for a single user. The use of such locomotives on a seasonal basis matches both utility industry and railroad needs. The use of all rail mounted equipment makes the facility mobile and eliminates the need for stationary equipment and foundations. The use of a roofless enclosure provides advantages of security, noise attenuation and acts as a visual shield, if needed. Steam could be generated from the exhaust of the diesel railroad locomotive in accordance with known steam generation techniques utilizing diesel engine exhaust. Moreover, an external silencer could be used on the diesel locomotive since it is stationary.

Since other variations will be apparent to those skilled in the art, it is the intention for the invention only to be limited by the scope of the appended claims.

I claim:

1. A method of producing synchronous electric power at utility transmission or subtransmission voltages to an electric utility grid during periods of peak electrical demand, the method comprising;
   (a) providing at least two conventional diesel electric railroad locomotives, each having a diesel engine with a speed governor for such engine, an electrical generator driven by the engine, electrical drive motors driven from electricity provided by the generator, railroad wheels on axles driven by the drive motors,
   (b) positioning the locomotives stationary at a location on railroad tracks,
   (c) disconnecting the electric drive motors of the locomotives from the locomotive generator,
   (d) connecting the output of the locomotive generators in parallel to generate synchronous electric power,
   (e) controlling the speed of the diesel engines within the tolerances required for synchronous alternating current generation, and
   (f) connecting the electrical output of the locomotive generators to step up transformer means and to an electric utility distribution grid.

2. A method as in claim 1 further comprising providing fuel to the locomotive from fuel contained in a conventional railroad tank car.

3. A method as in claims 1 or 2 further comprising connecting an external steam generator to the exhaust of diesel engines for cogeneration of power.

4. A method as in claim 3 further comprising silencing the diesel engine exhaust with an external exhaust gas silencer.

5. A method as in claims 1 or 2 further comprising providing a roofless enclosure for the locomotives to provide security and noise attenuation and a visual shield.

6. A mobile power plant for generating electricity on demand, the power plant comprising:
   (a) at least two conventional diesel electric railroad locomotives, each locomotive having a diesel engine, an electric generator driven by the engine, electric drive motors driven from electricity provided by the generator, railroad wheels on axles driven by the drive motors, the electric drive motor being disconnectable from the generator,
   (b) means for governing the speed of the diesel engine of each locomotive within tolerances required for synchronous alternating current generation,
   (c) electrical connections connecting the output of the generators of the diesel locomotives in parallel to provide synchronous electric power when the generator of each locomotive is disconnected from the locomotive drive motors, and
   (d) step up transformers and switch gear allowing the synchronous electric power to be connected to a utility grid system.

7. A power plant as defined in claim 6 further comprising a conventional railroad tank car and a fuel pump for providing fuel to the diesel electric locomotives.

8. A power platn as defined in claim 7 further comprising a roofless enclosure surrounding the locomotives and fuel tank.

* * * * *

UNITED STATES PATENT AND TRADEMARK OFFICE
CERTIFICATE OF CORRECTION

PATENT NO. : 5,065,581

DATED : November 19, 1991

INVENTOR(S) : Christopher P. Jenkins

It is certified that error appears in the above-identified patent and that said Letters Patent is hereby corrected as shown below:

Col. 4, line 61, "platn" should be --plant--.

Signed and Sealed this

Twentieth Day of April, 1993

Attest:

MICHAEL K. KIRK

Attesting Officer

Acting Commissioner of Patents and Trademarks